No. 692,806. Patented Feb. 4, 1902.
L. E. WATERMAN.
SAND BOX FOR WHEELS.
(Application filed Aug. 31, 1901.)
(No Model.)
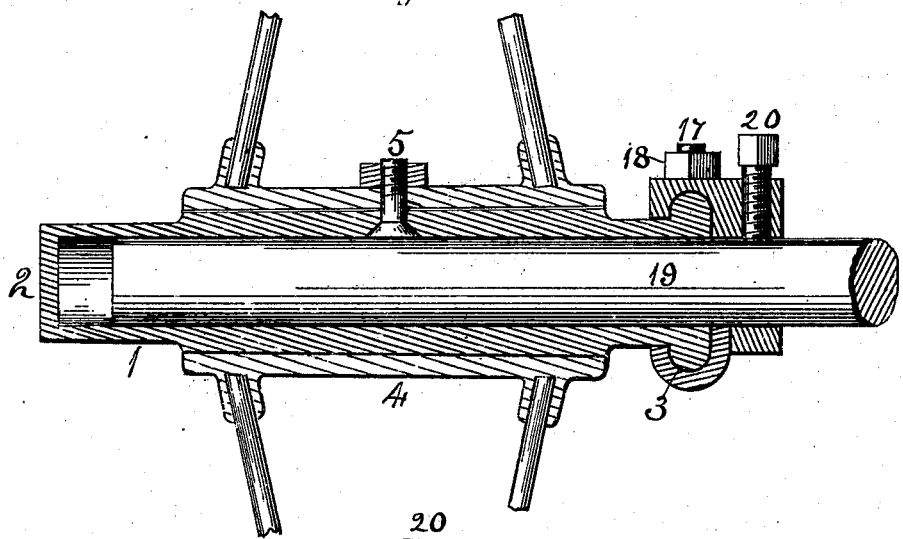
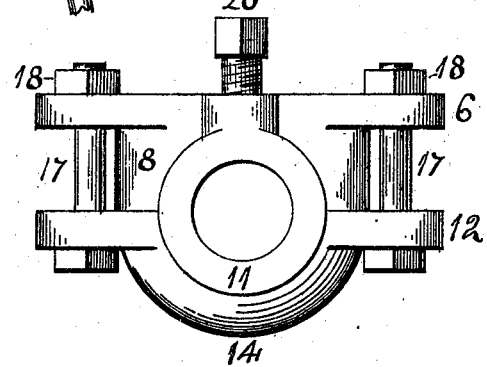
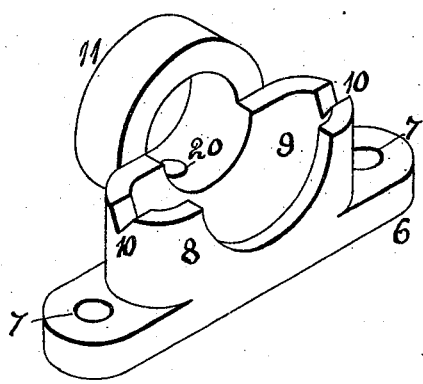
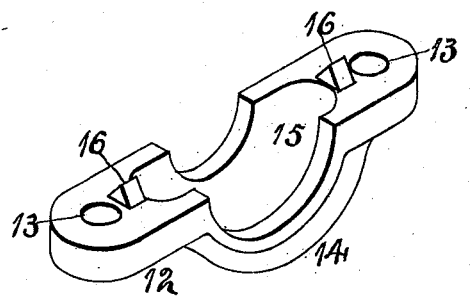
Witnesses:
M. J. Box
F. F. Cox
Inventor:
Lewis E. Waterman
By A. O. Behel
Atty.
THE NORRIS PETERS CO., PHOTO-LITHO., WASHINGTON, D. C.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS.

SAND-BOX FOR WHEELS.

SPECIFICATION forming part of Letters Patent No. 692,806, dated February 4, 1902.

Application filed August 31, 1901. Serial No. 74,035. (No model.)

*To all whom it may concern:*

Be it known that I, LEWIS E. WATERMAN, a citizen of the United States, residing at Rockford, in the county of Winnebago and State of Illinois, have invented certain new and useful Improvements in Sand-Boxes for Wheels, of which the following is a specification.

The object of this invention is to provide a sand-box for wheels. One section of the box has a connection with the axle, and if the axle revolves it revolves with it.

In the accompanying drawings, Figure 1 is a lengthwise section of a hub of a wheel, the sleeve located therein, and my improved sand-box in connection therewith. Fig. 2 is a face representation of the sand-box. Fig. 3 is an isometrical representation of the main section of the sand-box. Fig. 4 is an isometrical representation of the cap portion of the sand-box.

The sleeve 1 is of the usual form, having a closed end 2 and an enlarged rounded end 3. This sleeve is placed within the hub 4 of a wheel and held in place by a bolt 5.

The sand-box is in two parts, the main portion comprising a plate 6, provided with holes 7, a projection 8, having a semicircular cavity 9, recesses 10, and a collar 11. The cap portion has a plate 12, provided with holes 13, a projection 14, having a semicircular cavity 15, and projections 16.

The sand-box, with wheel attached, is placed in connection with the sleeve, the enlarged rounded end 3 of the sleeve located within the semicircular cavities of the sand-box, and the projections 16 guided within the recesses 10. Bolts 17 pass through the holes in the plate 6 and ears 12, and nuts 18, placed thereon, clamp the sections together. The axle 19 is passed through the collar 11 into the sleeve 1 and is held in connection therewith by the set-screw 20, passing through the collar of the sand-box and resting against the axle.

By forming one section of the sand-box with a collar the sand-box is firmly held in connection with the axle.

In most agricultural implements the axle remains stationary or has a slight oscillation and the wheel revolves on the axle, in which instance the sand-box remains a part of the axle and the rounded end of the sleeve revolves within the cavities of the sand-box and the end thrust is received at this point.

I claim as my invention—

1. A sand-box for wheels comprising two portions connected together and one portion having a solid collar integral therewith.

2. A sand-box for wheels comprising two portions connected together, one portion having a solid collar integral therewith, and a set-screw for the collar.

LEWIS E. WATERMAN.

Witnesses:
A. O. BEHEL,
E. BEHEL.